US008469851B2

(12) United States Patent
Demir

(10) Patent No.: US 8,469,851 B2
(45) Date of Patent: Jun. 25, 2013

(54) OIL SUPPLY SYSTEM FOR AN AUTOMATIC TRANSMISSION OF A VEHICLE, AN AUTOMATIC TRANSMISSION AND A VEHICLE COMPRISING THE OIL SUPPLY SYSTEM

(75) Inventor: Aytac Demir, Wolfisheim (FR)

(73) Assignee: GM Global Technology Operations LLC, Detroit, MI (US)

( * ) Notice: Subject to any disclaimer, the term of this patent is extended or adjusted under 35 U.S.C. 154(b) by 281 days.

(21) Appl. No.: 12/958,201

(22) Filed: Dec. 1, 2010

(65) Prior Publication Data
US 2011/0147154 A1 Jun. 23, 2011

(30) Foreign Application Priority Data

Dec. 1, 2009 (GB) .................................. 0921029.5

(51) Int. Cl.
*F04B 35/04* (2006.01)
(52) U.S. Cl.
USPC ....................................................... 475/136
(58) Field of Classification Search
USPC .................................................. 475/136, 137
See application file for complete search history.

(56) References Cited

U.S. PATENT DOCUMENTS

| 2,270,536 A * | 1/1942 | Lenning ........................... 475/48 |
| 5,145,329 A | 9/1992 | Zumbusch et al. |
| 6,350,108 B1 | 2/2002 | Haupt |
| 2007/0173370 A1 | 7/2007 | Kanayama et al. |
| 2007/0199396 A1* | 8/2007 | Taniai ............................... 74/335 |
| 2008/0236158 A1* | 10/2008 | Shimizu et al. .................. 60/468 |
| 2008/0300075 A1 | 12/2008 | Yoshinami |
| 2009/0118878 A1 | 5/2009 | Park |
| 2009/0177361 A1* | 7/2009 | Muller et al. .................... 701/51 |
| 2009/0257887 A1 | 10/2009 | Beattie, Jr. |
| 2010/0163360 A1* | 7/2010 | Fujii et al. ..................... 192/3.33 |
| 2011/0088796 A1* | 4/2011 | Fannin et al. ............. 137/565.11 |
| 2011/0293449 A1* | 12/2011 | Shimizu et al. ............... 417/415 |

FOREIGN PATENT DOCUMENTS

EP          1995497 A1   11/2008

OTHER PUBLICATIONS

British Patent Office, Search Report for British Application No. GB0921029.5, dated Mar. 22, 2010.

* cited by examiner

*Primary Examiner* — Sherry Estremsky
(74) *Attorney, Agent, or Firm* — Ingrassia Fisher & Lorenz, P.C.

(57) ABSTRACT

An oil supply system is provided for an automatic transmission of a vehicle that includes, but is not limited to a valve body and an electric oil pump. The valve body houses a plurality of hydraulic pressure control valves to control main pressure, torque converter and gear shifts of the automatic transmission. The valve body is in flow communication with an oil pan. The electric oil pump is driven by an electric supply and is configured to pump oil into the automatic transmission via the plurality of hydraulic control valves. The electric oil pump is positioned within the valve body or within the oil pan.

17 Claims, 3 Drawing Sheets

OIL SUPPLY SYSTEM FOR AN AUTOMATIC TRANSMISSION OF A VEHICLE, AN AUTOMATIC TRANSMISSION AND A VEHICLE COMPRISING THE OIL SUPPLY SYSTEM

CROSS-REFERENCE TO RELATED APPLICATION

This application claims priority to British Patent Application No. 0921029.5, filed Dec. 1, 2009, which is incorporated herein by reference in its entirety.

TECHNICAL FIELD

The technical field relates to an oil supply system for an automatic transmission of a vehicle, an automatic transmission and a vehicle comprising the oil supply system.

BACKGROUND

An automatic transmission of a vehicle uses pressurized oil in order to actuate the clutches and gear speed change mechanism of the automatic transmission. An automatic transmission may include an oil supply system including an oil pump for supplying the pressurized oil. Typically, the oil pump is mechanically driven by the vehicle drive. If the vehicle drive is the internal combustion engine, the oil pump may be driven by the crankshaft. In systems in which the oil pump is mechanically driven by the crankshaft, there is a delay between the initial start up of the engine that causes the crankshaft to rotate and drive the mechanical pump at a sufficient rpm (revolutions per minute) to supply oil to the automatic transmission at a pressure that is sufficient to actuate the clutch and allow the vehicle to move forward.

US 2009/0118878 A1 discloses an oil system for a vehicle that includes an external electrically driven oil pump as well as a mechanically driven oil pump for a hybrid electric vehicle having an automatic transmission. The external electrically driven oil pump can be used during initial start up as well as running of vehicle. This system may provide a more rapid response by preferably supplying a sufficient amount of oil to a transmission and engine clutch in the case of a quick start after a vehicle stop. However, the use of an additional external electrically driven oil pump has the disadvantage that this further component increases the complexity of the oil supply system due to the additional connections between the external oil pump and the oil supply system. The further component also increases the size of the oil supply system.

In view of the foregoing, it is desirable to provide an oil supply system for an automatic transmission in which an electrical pump can be more simply and compactly accommodated. In addition, other desirable features and characteristics will become apparent from the subsequent summary and detailed description, and the appended claims, taken in conjunction with the accompanying drawings and this background.

SUMMARY

An oil supply system is provided for an automatic transmission of a vehicle that comprises a valve body and an electric oil pump. The valve body houses a plurality of hydraulic pressure control valves configured to control main pressure, torque converter and gear shifts of the automatic transmission. The valve body is in flow communication with an oil pan. The electric oil pump is driven by an electric supply and is configured to pump oil into the automatic transmission via the plurality of hydraulic pressure control valves. The electric oil pump is positioned either within the valve body or within the oil pan.

The arrangement of the electric oil pump within the valve body or within the oil pan provides a compact oil supply system and avoids the need for an additional housing around the electric oil pump and the need for additional circuit elements extending between a housing of an external electric oil pump and the valve body and/or the automatic transmission. The electric oil pump may be positioned within the oil reserve already available within the valve body or the oil pan so that no additional conduits are required to connect the pump to the oil supply system.

The electric oil pump may have any design. In some embodiments, the electrical oil pump is of the type disclosed in U.S. Pat. No. 6,350,108 or U.S. Pat. No 5,145,329, both of which are incorporated by reference in their entirety. These types of electrically driven pumps include a housing with an internally toothed outer pump gear wheel and a stator winding which surrounds the internally toothed gear wheel. The internally toothed gear wheel meshes with an externally toothed inner pump gear so that upon rotation of the outer pump gear, the intermeshing of the inner pump gear and outer pump gear tends to draw low-pressure fluid into the pump, pressurizes it within the trapped volumes between the inner pump gear and outer pump gear and discharges pressurized oil from the outlet of the pump.

In one embodiment, the electric oil pump is positioned horizontally within the valve body or within the oil pan. This arrangement enables the electric oil pump to be positioned within the oil reserve of the valve body or oil pan even when movement of the vehicle causes the level of the oil reserve to deviate from a perfect horizontal.

In an embodiment, the electric oil pump is actuatable when a vehicle drive of the vehicle is stopped. An electric supply, which drives the electric oil pump, is operable independently of the vehicle drive in order to actuate the electric oil pump when the vehicle drive is stopped. This enables the electric oil pump to provide pressurized oil to the automatic transmission before a vehicle drive is started. This enables a more rapid initial start of the vehicle than that achievable by an oil pump which is directly driven by the vehicle drive.

In a further embodiment, the electric oil pump is actuatable when a vehicle drive of the vehicle idles. The vehicle drive idles when the vehicle is stationary and the vehicle drive does not supply torque to the transmission. Multiple idle stops may occur in heavy traffic, for example. During an idle stop, the electric supply may be actuated to drive the electric oil pump so that pressurized oil can be delivered to a clutch, such as a torque converter or a dual clutch of the automatic transmission, and allow the vehicle to start and move forward more rapidly than is achievable with a pump driven directly by the vehicle drive.

The oil supply system can be usefully used in a stop and start system of an automatic transmission of a road vehicle to provide a rapid response after the drive has pressed the accelerator pedal.

The electric oil pump may be configured to supply oil with pressure required to actuate a clutch mechanism, such as the torque converter or a dual clutch which enables the transmission to be shifted from neutral into drive, and/or the gear changing mechanism. The electric oil pump may be configured to only supply oil with a pressure required to actuate the clutch mechanism and, therefore, only supply oil at the start of the vehicle drive or start of the vehicle from an idle stop. In this embodiment, the oil supply system may comprise an additional pump such as a mechanical oil pump which is driven by the vehicle drive of the vehicle. The mechanical oil pump can be used to supply pressurized oil to the automatic transmission once the vehicle drive has started. Alternatively, the electrical pump may be configured to supply oil with a pressure required to actuate a clutch not only upon initial start, but also to actuate further clutches of the automatic transmission in order to be able to shift gears of the automatic transmission. In this embodiment, the oil supply system may include only the electric oil pump and no further electrical or mechanical oil pump.

In embodiments in which the oil supply system further comprises a mechanical oil pump driven by the vehicle drive, the mechanical oil pump may be configured to supply oil to the plurality of hydraulic pressure control valves and be configured to actuate the clutch mechanism in order to actuate the gear speed changing mechanism.

The vehicle drive may be an internal combustion engine, such as a spark ignition engine or a diesel engine. The vehicle drive, may, however be an electric drive that is driven by a battery or fuel cell, for example.

The mechanical oil pump, if present, may be positioned concentric to the axis of an input shaft of the automatic transmission or be positioned off-axis from the input shaft of the automatic transmission. The position of the mechanical oil pump may be chosen depending on the space available.

An automatic transmission is also provided for a vehicle that comprises an input shaft, a gear speed changing mechanism, a clutch mechanism, an output shaft and the oil supply system according to one of the embodiments described above. The automatic transmission also includes an electric supply to drive the electric oil pump. Whilst the electric supply drives the pump, the electric oil pump is configured to supply oil to gear changing mechanism and the clutch mechanism via the plurality of hydraulic pressure control valves housed within the valve body. The electric supply may be operated independently of a prime vehicle drive, such as an internal combustion engine, in order to enable pressurized oil to be supplied to automatic transmission whilst a prime vehicle drive is stopped or idly stopped in order to provide a stop and start system for the automatic transmission with a rapid response. The clutch mechanism may be a torque converter which transfers torque from the engine to the transmission or decouples the engine from the transmission or a dual clutch. A dual clutch may be configured so that a first clutch is actuated to actuate the odd gears and a second clutch is actuated to actuate the even gears.

A vehicle is also provided including the automatic transmission according to the above embodiments. The vehicle may further comprise a vehicle drive that may be configured to drive the mechanical oil pump, if present. In one embodiment, the vehicle is a road vehicle and the vehicle drive is an internal combustion engine such as a spark ignition engine or a diesel engine.

In summary, an oil supply system is provided for supplying pressurized oil to an automatic transmission of a vehicle that comprises an electric oil pump which may be positioned horizontally in the oil pan or within the valve body. The electric oil pump is driven by an electric supply which is independently operable from the prime vehicle drive such as an internal combustion engine. Therefore, the electrical pump may be used in order to provide oil pressure to the automatic transmission when the vehicle drive is stopped or idly stopped so that a rapid response in a stop and start system is provided. The position of the electric oil pump within the oil pan or within the valve body provides a compact system.

The use of additional conduits to connect the electric oil pump into the oil supply system can be avoided if the electric oil pump is positioned directly in the in reserve present in the valve body or oil pan. This reduces the number of joints in the circuit of the oil supply system and reduces the possible sites for leaks.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
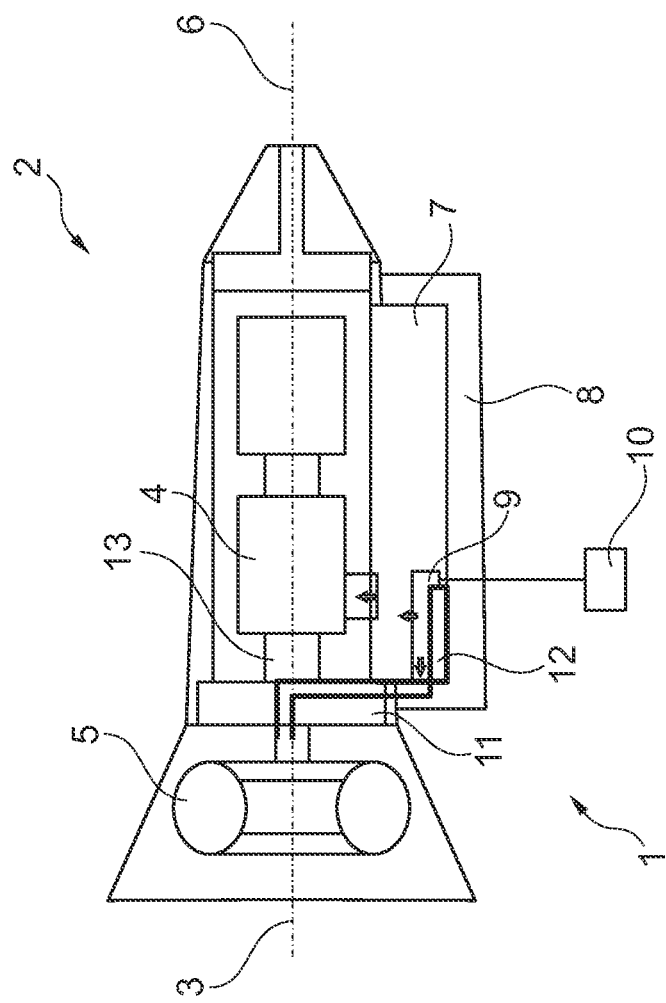
FIG. 1 illustrates an oil supply system of an automatic transmission according to a first embodiment.

FIG. 1 illustrates a schematic diagram of an oil supply system 1 of an automatic transmission 2 of a non-illustrated vehicle according to a first embodiment. The automatic transmission 2 includes an input shaft 3 driven by a vehicle drive, such as a spark ignition engine or a diesel engine. The automatic transmission 2 also includes a gear changing mechanism 4 and a clutch mechanism 5 in the form of a torque converter which couples the input shaft 3 to the output shaft 6 and transfer torque from the input shaft 3 to the output shaft 6. The automatic transmission 2 includes a plurality of gear speeds, for example 5 to 8 forward gear speeds.

The oil supply system 1 comprises a valve body 7 which houses a plurality of hydraulic pressure control valves, indicated generally by 11, arranged to perform gear shifts of the automatic transmission 2 by supplying pressurized oil to the gear changing mechanism 4. The valves are configured to command the different gears. The valve body 7 also controls the main pressure and supplies pressurized oil to the torque converter 5. The valve body 7 is in flow communication with an oil pan 8. The oil supply system 1 further includes an electric oil pump 9 which is driven by an electric supply 10. The electric oil pump 9 is arranged and configured to pump oil into the automatic transmission 2 via the plurality of hydraulic control valves 11. In the embodiment illustrated in FIG. 1, the electric oil pump 9 is positioned within the valve body 7. In particular, the electric oil pump 9 is positioned horizontally within the valve body 7. As used herein, horizontally refers to a direction generally parallel to the base of the vehicle.

The electric oil pump 9 is positioned in the circuit of the oil supply system 1 upstream of a filter 12 which, in this embodiment, is positioned in the oil pan 8. The electric oil pump 9 is configured to supply pressurized oil through the filter 12 to the hydraulic pressure control valves 11 and torque converter 5 and also into the gear changing mechanism 4 of the automatic transmission 2.

The electric supply 10 can be operated independently of the vehicle drive, for example an internal combustion engine, and is operable to drive the electric oil pump 9 when the engine is switched off or when the engine idles. Therefore, the electric supply 10 can drive the electric oil pump 9 to supply pressurized oil to the automatic transmission 2 whilst the internal combustion engine is stopped or in an idle stop.

The oil supply system 1 further includes a mechanical oil pump 13 which is driven by the internal combustion engine. In this embodiment, the mechanical oil pump 13 is positioned concentric with the input axis of the automatic transmission 2. In further non-illustrated embodiments, the mechanical oil pump may be positioned off-axis from the input shaft 3. The mechanical oil pump 13 may be used in place of the electric oil pump 9 once the vehicle drive rotates at a sufficient speed to drive the mechanical oil pump 13 so that it supplies oil at a pressure sufficient for the clutches and gear speed changing mechanism of the automatic transmission.

If the vehicle is in an idle stop and the vehicle should be driven forward, for example in response to the driver pressing the acceleration pedal, the electric supply 10 can be actuated to drive the electric oil pump 9 to supply pressurized oil to the automatic transmission 2 to so as to enable the torque converter 5 to be actuated and enable the vehicle to move forward.

The actuation of the torque converter 5 can be performed more rapidly by use of the electric oil pump 9 than may occur if the mechanical oil pump 13 is used which is directly driven by the engine, since the engine takes a short time to rotate sufficiently quickly to drive the mechanical oil pump 13 to supply the required oil pressure. Therefore, the oil supply system 1 illustrated in FIG. 1 may be used in a stop and start system for an automatic transmission in order to reduce the delay between the pressing of the accelerator and the vehicle moving off.

Figure 2:
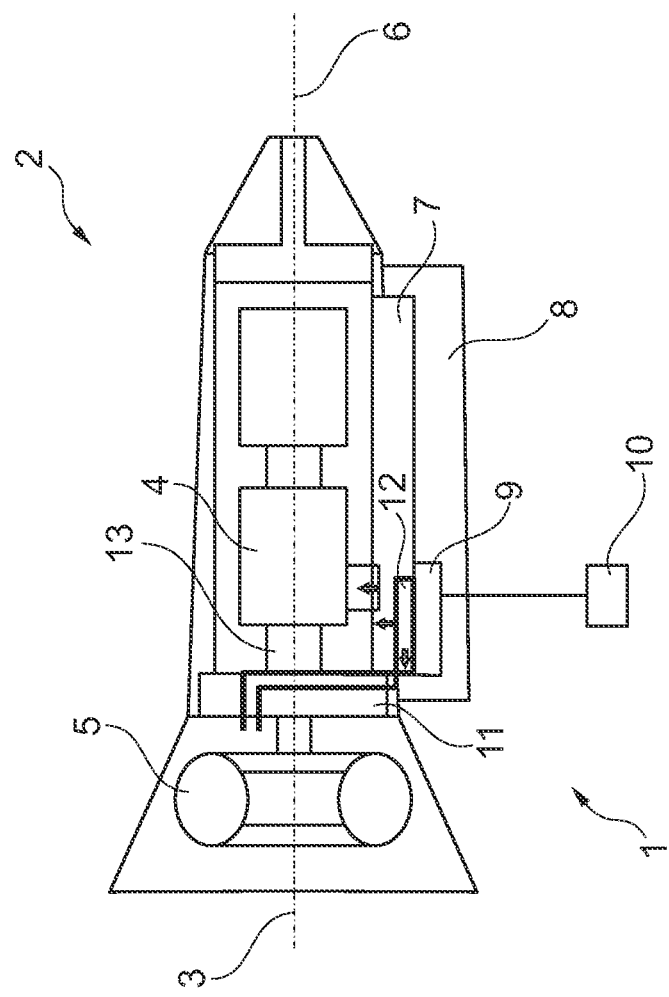
FIG. 2 illustrates an oil supply system of an automatic transmission according to a second embodiment.

FIG. 2 illustrates an oil supply system 1 of automatic transmission 2 according to a second embodiment. The automatic transmission 2 includes many of the same features as that of first embodiment and these are indicated with the same reference number and are not described again in detail. In the oil supply system 1 of the second embodiment, the electric oil pump 9 is positioned within the oil pan 8 rather than within the valve body 7 as in the first embodiment. Again, the electric oil pump is positioned horizontally. In the second embodiment, the oil is drawn, first, through the filter 12 and then into to the electric oil pump 9 before the pressurized oil is delivered to the automatic transmission 2.

The oil supply system 1 according to the second embodiment also includes a mechanical oil pump 13 which is driven by the internal combustion engine. As in the first embodiment, the mechanical oil pump 13 may be used in place of the electric oil pump 9 once the vehicle drive rotates at a sufficient speed to drive the mechanical oil pump 13 so that it supplies oil at a pressure sufficient for the gear changing mechanism 4, such as a gear speed changing mechanism, of the automatic transmission 2.

Figure 3:
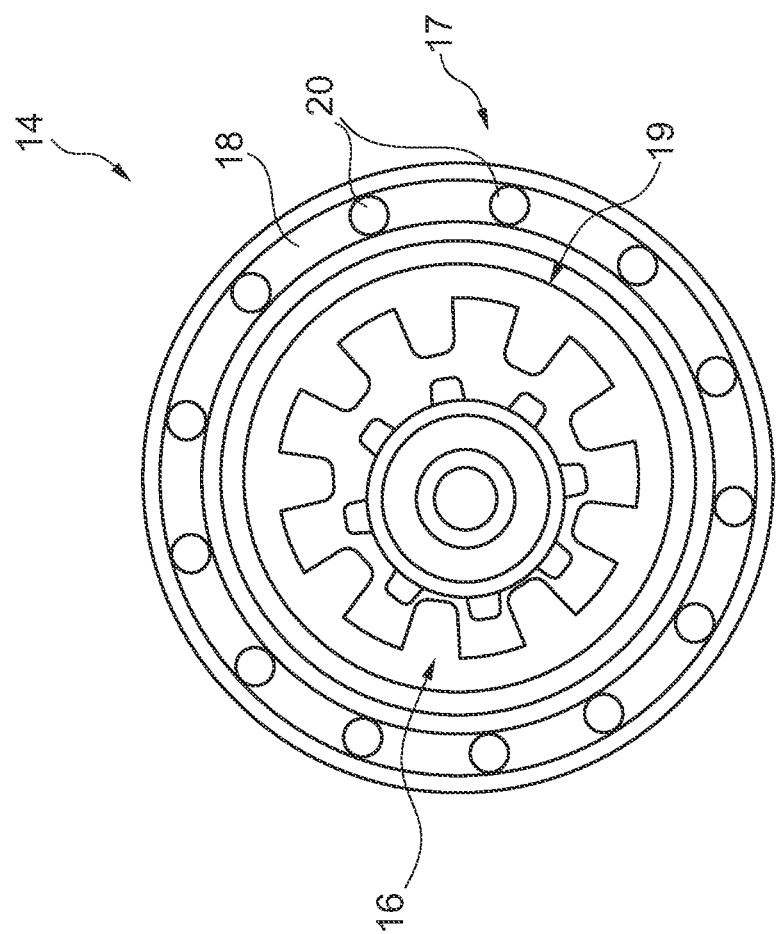
FIG. 3 illustrates an electric pump for use in the oil supply system of FIG. 1 and FIG. 2.

FIG. 3 illustrates an electric pump 14 which may be used as the electric oil pump 9 of the oil supply system 1 illustrated in FIG. 1 and FIG. 2. Electric pumps of this type disclosed in U.S. Pat. No. 6,350,108 and U.S. Pat. No. 5,145,329 are suitable for use as the electric oil pump 9 in the oil supply system 1 illustrated in FIG. 1 and FIG. 2. The electric pump 14 includes an inner pump gear 15 that is externally toothed and an outer pump gear 16 which is internally toothed and eccentrically disposed for relative rotation with the inner pump gear 15. The inner pump gear 15 and outer pump gear 16 are disposed within a cavity defined by a housing having an inlet port and an outlet port.

The outer pump gear 16 can be considered as the rotor of an electrical motor. The stator 17 of this electrical motor is integrated in the pump housing and comprises a plurality of pole pieces 18 that are circumferally spaced, each pole piece having a winding 20 electrically connected to the electric supply 10. The outer surface of the outer pump gear 16 includes a plurality of permanent magnets 19 which are alternately polarized. When the windings 20 are electrically energized by the electric supply 10, the permanent magnets 19 are caused to rotate with the outer pump gear 16 due to magnetic interaction between the permanent magnets 19, and the windings 20 and associated plurality of pole pieces 18 of the stator 17. The intermeshing of the outer pump gear 16 with the inner pump gear 15 draws low-pressure fluid through the inlet port, pressurizes it within the trapped volumes between the inner pump gear 15 and the outer pump gear 16 and discharges the pressurized fluid through the outlet port from where it is directed into the hydraulic pressure control valves 11 to actuate the clutches of the automatic transmission 2. The electric pump 14 can be positioned within the valve body 7 or within the oil pan 8 of the oil supply system 1 illustrated in FIG. 1 and FIG. 2.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An oil supply system for an automatic transmission of a vehicle, comprising:
   a valve body adapted to house a plurality of hydraulic pressure control valves and control a main pressure;
   an oil pan in flow communication with the valve body;
   an electric supply; and
   an electric oil pump positioned within the valve body, driven by the electric supply, and adapted to pump oil into the automatic transmission via the plurality of hydraulic pressure control valves;
   wherein the electric oil pump is actuatable when a vehicle drive of the vehicle is in an idle state.

2. The oil supply system according to claim 1, wherein the electric oil pump is positioned in a substantially horizontal position.

3. The oil supply system according to claim 1, wherein the electric oil pump is actuatable when a vehicle drive of the vehicle is in a stopped state.

4. The oil supply system according to claim 3, wherein the vehicle drive is an internal combustion engine.

5. The oil supply system according to one of claim 1, wherein the electric oil pump is configured to supply the oil with a pressure to actuate a gear changing mechanism.

6. The oil supply system according to claim 1, further comprising a mechanical oil pump adapted to be driven by a vehicle drive and adapted to supply the oil to the plurality of hydraulic pressure control valves.

7. The oil supply system according to claim 6, wherein the mechanical oil pump is positioned in a substantially concentric position related to an axis of an input shaft of the automatic transmission.

8. The oil supply system according to claim 6, wherein the mechanical oil pump is positioned in an off axis position from an input shaft of the automatic transmission.

9. An oil supply system for an automatic transmission of a vehicle, comprising:
  a valve body adapted to house a plurality of hydraulic pressure control valves and control a main pressure;
  an oil pan in flow communication with the valve body;
  an electric supply; and
  an electric oil pump positioned within the oil pan, driven by the electric supply, and adapted to pump oil into the automatic transmission via the plurality of hydraulic pressure control valves;
  wherein the electric oil pump is actuatable when a vehicle drive of the vehicle is in an idle state.

10. The oil supply system according to claim 9, wherein the electric oil pump is positioned in a substantially horizontal position.

11. The oil supply system according to claim 9, wherein the electric oil pump is actuatable when a vehicle drive of the vehicle is in a stopped state.

12. The oil supply system according to claim 11, wherein the vehicle drive is an internal combustion engine.

13. The oil supply system according to claim 9, wherein the electric oil pump is configured to supply the oil with a pressure to actuate a gear changing mechanism.

14. The oil supply system according to claim 9, further comprising a mechanical oil pump adapted to be driven by a vehicle drive and adapted to supply the oil to the plurality of hydraulic pressure control valves.

15. The oil supply system according to claim 14, wherein the mechanical oil pump is positioned in a substantially concentric position related to an axis of an input shaft of the automatic transmission.

16. The oil supply system according to claim 14, wherein the mechanical oil pump is positioned in an off axis position from an input shaft of the automatic transmission.

17. An automatic transmission for a vehicle, comprising;
  a gear speed changing mechanism;
  a clutch mechanism, wherein the clutch mechanism is a torque converter or a dual clutch; and
  an oil supply system, the oil supply system comprising:
    a valve body adapted to house a plurality of hydraulic pressure control valves and control a main pressure;
    an oil pan in flow communication with the valve body; and
    an electric supply;
    an electric oil pump positioned within the valve body or the oil pan, driven by the electric supply and adapted to pump oil into the automatic transmission via the plurality of hydraulic pressure control valves,
  wherein when the electric supply is adapted to drive the electric oil pump, the electric oil pump is configured to supply the oil to the gear speed changing mechanism and the clutch mechanism via the plurality of hydraulic pressure control valves.

* * * * *